UNITED STATES PATENT OFFICE.

ALEXANDER D. ELBERS, OF HOBOKEN, NEW JERSEY.

PROCESS OF DESULFURIZING BLAST-FURNACE SLAG IN ITS MOLTEN STATE.

SPECIFICATION forming part of Letters Patent No. 558,370, dated April 14, 1896.

Application filed April 25, 1895. Serial No. 547,179. (No specimens.)

*To all whom it may concern:*

Be it known that I, ALEXANDER D. ELBERS, of Hoboken, in the county of Hudson and State of New Jersey, have invented a new and Improved Process of Desulfurizing Blast-Furnace Slag in its Molten State, of which the following is a full, clear, and exact description.

This invention relates to a process for desulfurizing fresh-tapped slag or cinder of iron-ore smelting or blast furnaces in the ladles or receivers into which it is flushed in such manner that it retains sufficient fluidity to be cast into molds or to be granulated in water after its treatment is finished.

The object of this invention is to form the desulfurized slag into ornamental building-stone, lintels, sills, and flags, by casting it into molds, to use it in its granulated state for the composition of cement, mortars, and concrete, and to apply it to other uses in the technical arts, for which it is unfit in its sulfurous condition.

The invention consists in treating sulfurous slag while it runs into the ladles, or after it has collected therein, with easily-fusible substances that can unite with the principal sulfurous impurities to form a scum, (similar to the gall that collects on the surface of a molten-glass batch,) as well as with other reagents that combine readily with the silicates of the slag, and thereby promote the formation of the scum.

Blast-furnace slag that is of such composition as to be in other respects desirable for the uses heretofore mentioned contains from about two to four per cent. of sulfurous impurities, which consist chiefly of sulfids of calcium, or of sulfids of calcium and magnesium. These sulfids are presumably of somewhat lower specific gravity than the silicates to which they are united in the slag; but they are so intimately intermixed with these silicates that they cannot segregate to any appreciable extent however liquid-melted the slag may be. In order to eliminate them from the ladled slag, I propose to combine them with easily-fusible substances of still lower specific gravity—such as the sulfates, sulfites, and sulfids of the alkali metals that can unite with them to form a scum—and in order to cause the slag to undergo such complete molecular rearrangements that the respective admixtures are brought into thorough contact with the sulfids of the slag, I propose to admix also easily-fusible substances that combine readily with the silicates of the slag, such as the borates of sodium and calcium and the artificial silicates of the alkali metals commonly known as "soluble glass;" but as the object of this invention is that the desulfurized slag shall retain its stony characteristics and not become a glass-like substance the quantity of those admixtures that have a vitrifying tendency by reason of combining with the silicate mass must necessarily be reduced to a minimum. For commercial reasons it is also desirable to employ only the cheapest of the reagents by the aid of which the respective changes can be produced.

The process can be carried out as follows: As reagents I use, by preference, calcined sodium sulfate and fused sodium silicate, both in their unrefined state. The sulfate may be produced by treating common salt with sulfuric acid and the silicate by melting together sodium sulfate, sand, and charcoal. The sulfate when thus made is apt to contain some undecomposed salt, and the silicate is apt to contain some unconsumed carbon, as well as sodium sulfid. These impurities are, however, not objectionable, inasmuch as they are apt to produce various subsidiary reactions, which need not be here described.

The functions of the essential reagents may be explained as follows: As the ladled slag is steadily losing heat, its main mass can only be put into thorough molecular commotion by admixtures that combine with it under evolution of heat and consequently lower its freezing-point, which the sodium silicate does. The sodium sulfate, on the other hand, has less chemical affinity for the silicates, on which it cannot react, than for the sulfids of the slag on which it can react, provided the temperature of the slag is high enough. On account of this chemical affinity the sulfids of the slag are apt to attach themselves to the sodium sulfate as soon as they come in contact with it. Though this union does not necessarily involve the decomposition of either ingredient, it is apt to be followed by the reduction of a portion of the sodium sulfate to sodium sulfite, and by the oxidation of a portion of the sulfids of the slag, especially of the magnesium sulfid. The greater portion of these sulfids, is, however, apt to remain undecomposed and to unite with undecomposed sodium sulfate, with sodium sulfite, and with incidental admixtures to scummy agglomerations that rise to the surface.

I will now proceed to describe the different operations: The slag that is to be treated should be kept as hot as possible, which is best done by flushing it into ladles that are lined inside with a suitable refractory material and by preheating the ladles. The ladles should be oval in shape and should be put up in such manner that they can be emptied by tipping them over as well as by tapping the bottom. The details of these arrangements, as well as of suitable devices for removing the filled ladles to the place where their contents can be conveniently discharged and manipulated, are well understood and have to be adapted to local conditions.

The reagents may be applied in the following proportions: first, of sodium silicate, about one per cent. of the weight of the ladled slag; second, of calcined sodium sulfate, about fifty per cent. more by weight than the sulfur contents of the slag amount to. Thus a charge of three thousand pounds of slag carrying one per cent. of sulfur should be dosed with about thirty pounds of sodium silicate and with about forty-five pounds of sulfate. The most suitable proportions have, however, to be determined in practice. The reagents should be coarsely mixed, the sodium silicate being first reduced to about pea size, and the mixture should be placed in the bottom of the ladles, where it will consolidate while the ladles are being preheated. A portion of the mixture may also be sprinkled on the slag while it runs into the ladles, if that should be found to be of advantage.

The reactions that set in after the slag comes in contact with the reagents are apt to come to a finish in about ten or fifteen minutes. The ebullition of the charges is not apt to be violent and may even be intensified by stirring. It is, however, advisable to place the charged ladles under a hood and to draft the escaping gases into a chimney. As soon as the ebullition has ceased the ladles may be removed to the spot where they are to be discharged. When the contents are to be discharged by tipping, the scum or gall that has collected on the surface has first to be removed; but when the ladles are to be tapped at the bottom it may be allowed to remain, to be thereafter removed with the skulled or chilled slag that remains in the bottom of the ladle. The cast-off scum may be treated for the recovery of sodium sulfate.

Having thus described my invention, I claim as new and desire to secure by Letters Patent—

The herein-described process of desulfurizing fresh-tapped slag or cinder of iron-ore smelting or blast furnaces, which consists in treating the slag in the ladles or receivers into which it is flushed, or while it runs into them, with reagents that cause the principal sulfurous impurities of the slag to segregate, substantially as described, said reagents consisting of, first: easily-fusible substances of light specific gravity that can unite with the principal sulfurous impurities of the slag to form a scum, such as sodium sulfate or its equivalent, and second, of easily-fusible hyaloid salts (salts of silicon or boron) such as sodium silicate or its equivalent, which by reason of uniting readily with the silicates of the slag cause the latter to undergo such thorough molecular rearrangements as to promote the formation of the scum.

ALEXANDER D. ELBERS.

Witnesses:
J. FRED. ACKER,
F. W. HANAFORD.